US008715887B2

(12) United States Patent
Takemori et al.

(10) Patent No.: US 8,715,887 B2
(45) Date of Patent: May 6, 2014

(54) COMPLEX HOLOGRAMS, METHOD OF MAKING AND USING COMPLEX HOLOGRAMS

(75) Inventors: Michael Teruki Takemori, Rexford, NY (US); Amitabh Bansal, Hoboken, NJ (US); Andrew A. Burns, Schenectady, NY (US); Mark Cheverton, Mechanicville, NY (US); Sumeet Jain, Niskayuna, NY (US)

(73) Assignee: Sabic Innovative Plastics IP B.V. (NL)

( * ) Notice: Subject to any disclaimer, the term of this patent is extended or adjusted under 35 U.S.C. 154(b) by 264 days.

(21) Appl. No.: 12/847,105

(22) Filed: Jul. 30, 2010

(65) Prior Publication Data

US 2012/0026564 A1  Feb. 2, 2012

(51) Int. Cl.
*G03H 1/02* (2006.01)
*G03H 1/04* (2006.01)
*G03H 1/18* (2006.01)

(52) U.S. Cl.
CPC ......... *G03H 1/04* (2013.01); *G03H 2001/0415* (2013.01); *G03H 2001/186* (2013.01)
USPC .......... 430/1; 430/2; 359/22; 359/24

(58) Field of Classification Search
None
See application file for complete search history.

(56) References Cited

U.S. PATENT DOCUMENTS

| 3,730,734 | A | * | 5/1973 | Delzenne ..................... 430/147 |
| 4,166,043 | A | | 8/1979 | Uhlmann et al. |
| 4,367,170 | A | | 1/1983 | Uhlmann et al. |
| 4,986,619 | A | * | 1/1991 | Walker et al. ..................... 359/3 |
| 5,223,356 | A | | 6/1993 | Kumar et al. |
| 5,379,133 | A | * | 1/1995 | Kirk ................................ 359/15 |
| 5,731,108 | A | * | 3/1998 | Biles ................................ 430/1 |
| 5,786,123 | A | | 7/1998 | Burns et al. |
| 5,982,963 | A | * | 11/1999 | Feng et al. ..................... 385/37 |
| 6,091,879 | A | | 7/2000 | Chan et al. |
| 6,529,297 | B1 | | 3/2003 | Kodama |
| 7,102,802 | B1 | | 9/2006 | Erben et al. |
| 7,122,290 | B2 | | 10/2006 | McLaughlin et al. |
| 7,388,695 | B2 | | 6/2008 | Lawrence et al. |
| 7,576,898 | B2 | | 8/2009 | Molteni et al. |
| 2001/0051020 | A1 | * | 12/2001 | Kashyap ......................... 385/37 |
| 2003/0156308 | A1 | * | 8/2003 | Brotherton-Ratcliffe et al. ............................ 359/29 |
| 2004/0043301 | A1 | | 3/2004 | Hirao et al. |
| 2004/0170209 | A1 | * | 9/2004 | Matuschek et al. ............. 372/97 |

(Continued)

FOREIGN PATENT DOCUMENTS

JP  48-102612  * 12/1973
JP  49-017225  *  2/1974

(Continued)

OTHER PUBLICATIONS

Wesson et al., "Dye diffusion in swollen gels by forced Rayleigh scattering", . Appl. Phys., vol. 53(10) pp. 6513-6519 (1982).*
Bai et al., "Azobenzene-containing thermoplastic elastomers: coupling mechanical and optical effect", Macromol. vol. 34(26) pp. 9032-9038 (2001).*

(Continued)

*Primary Examiner* — Martin Angebranndt
(74) *Attorney, Agent, or Firm* — Cantor Colburn LLP

(57) ABSTRACT

A method of making a hologram includes recording a first hologram in a holographic recording medium at a first deformation ratio; changing the first deformation ratio to a second deformation ratio that is different from the first deformation ratio; and recording a second hologram in the holographic recording medium at the second deformation ratio to form a recorded holographic medium.

20 Claims, 1 Drawing Sheet

(56) References Cited

U.S. PATENT DOCUMENTS

| | | | |
|---|---|---|---|
| 2005/0036179 | A1 | 2/2005 | Chisholm et al. |
| 2005/0283234 | A1 | 12/2005 | Zhou et al. |
| 2006/0073392 | A1 | 4/2006 | Erben et al. |
| 2006/0078802 | A1 | 4/2006 | Chan et al. |
| 2006/0199081 | A1 | 9/2006 | McLaughlin et al. |
| 2007/0064195 | A1 | 3/2007 | Destro et al. |
| 2007/0097469 | A1 | 5/2007 | Erben et al. |
| 2007/0116920 | A1 | 5/2007 | Krishnan et al. |
| 2007/0127329 | A1 | 6/2007 | Erben et al. |
| 2007/0147214 | A1 | 6/2007 | Erben et al. |
| 2007/0206448 | A1 | 9/2007 | Tsukagoshi et al. |
| 2007/0231744 | A1 | 10/2007 | Sasao et al. |
| 2008/0005586 | A1 | 1/2008 | Munguia |
| 2008/0084592 | A1 | 4/2008 | Boden et al. |
| 2008/0085455 | A1 | 4/2008 | McLaughlin et al. |
| 2008/0137032 | A1 | 6/2008 | Lawrence et al. |
| 2008/0144145 | A1 | 6/2008 | Boden et al. |
| 2008/0144146 | A1 | 6/2008 | Boden et al. |
| 2008/0158627 | A1 | 7/2008 | Lawrence et al. |
| 2008/0285100 | A1* | 11/2008 | Evans et al. ............ 359/22 |
| 2009/0068569 | A1 | 3/2009 | Seta et al. |

FOREIGN PATENT DOCUMENTS

| | | | |
|---|---|---|---|
| JP | 62-245251 | * | 10/1987 |
| WO | 9740421 | A1 | 10/1997 |
| WO | 0150113 | A1 | 7/2001 |
| WO | 0158856 | A1 | 8/2001 |
| WO | 2004023220 | A1 | 3/2004 |
| WO | 2005022525 | A1 | 3/2005 |
| WO | 2005066949 | A1 | 7/2005 |
| WO | 2005101396 | A1 | 10/2005 |
| WO | 2006039130 | A1 | 4/2006 |
| WO | 2006044243 | A2 | 4/2006 |
| WO | 2006062781 | A1 | 6/2006 |
| WO | 2007059288 | A1 | 5/2007 |
| WO | 2007061776 | A1 | 5/2007 |
| WO | 2008036295 | A2 | 3/2008 |

OTHER PUBLICATIONS

Peng et al., "Recent research on polymer optical fiber photosensitivity and highly tunable optical fibre Bragg grating", Proc SPIE, vol. 4110 pp. 123-138 (2000).*

Takase et al. "photocrosslinked surface relief gratings on azobenzene containing copolymer films", Polym. vol. 44 pp. 7345-7351 (2003).*

Bai et al., "Azobenzene elatstomers for mechnically tunable diffraction gratings", Macromol. vol. 35(26) pp. 9657-9664 (2002).*

Wuest et al., "color control in reflection hologrtams by humidity", Appl. Opt., vol. 30(17) pp. 2363-2367 (Jun. 1991).*

Zhang et al., "Hiugh efficiency holographic volume index gratings in Dr1-dye doped poly(methyl methacrylate)", Opt. Lett., vol. 27(13) pp. 1105-1107 (Jul. 2002).*

Lui et al., "A simple strain sensor using polymer fibre Bragg grating and long period fibre grating", Proc. SPIE vol. 5634 pp. 123-127 (2005).*

Beyer et al. holographic recording of Bragg gratings for wavelength multiplexing in doped and partially polymerized poly(methyl methacrylate), Appl. Opt., vol. 42(1) pp. 30-37 (Jan. 2003).*

Devetak et al., "Micropatterning of light sensitive liquid crystal elastomers", Phys. Rev. E., vol. 80 pp. 050701-1 to 050701-4 (Nov. 2009).*

Hattori et al., "Fabrication of refractive index grating into an azo-dye containing polymer films by irreversible photoinduced bleaching", J. Appl. Phys., vol. 87(7) pp. 3240-3244 (Apr. 2000).*

Kersey et al., "Fiber grating sensor", J. Lightwave technol. vol. 15(8) pp. 1442-1463 (Aug. 1997).*

Castillo et al., "Response of axially stressed edge-illuminated holographic gratings in PQ/PMMA photopolymers", IEEE Photon Technol. Lett., vol. 20(13) pp. 1199-1201 (Jul. 2008).*

Kuzyk et al., "All-optical devices in polymeric optical fiber", Chem. Phys., vol. 245 pp. 533-544 (1999).*

Kalli et al., "Non-linear temperature response of Bragg gratings in doped and undoped holey polymer optical fibre", Proc. SPIE, vol. 6588 pp. 65880E-1 to 65880E-8 (2007).*

Zhou et al. "Bandpass filter by a stretch and double exposure technique", Proc. SPIE vol. 3552 pp. 49-54 (1998).*

Yu "Photosensitive polymer optical fibers and gratings", Thesis, The Hong Kong Polytechnic University, Thesis, 207 pages (Mar. 2005).*

Hubbard et al., "Poled polymeric second harmonic generation materials: Chemical manipulation of the temporal characteristics of electric field-induced noncentrosymmetry", Proc. SPIE, vol. 971 pp. 136-143 (1988).*

Byron et al., "Fabrication of chirped fibre gratings by novel stretch and write technique", Electron Lett., vol. 31(1) pp. 60-61 (Jan. 1995).*

Zheng et al., Chirped fiber bragg gratings with arbitrary group delay responses using stepped-stetching fiber method. Appl. Phys B:Lasers & Opt., vol. 82 pp. 59-63 (2006).*

Coutandin et al., "Diffusion of dye molecules in polymers above and below the glass transition temperature studied by holographic grating technique", Macromol., 18 pp. 857-589 (1985).*

Jiang et al. "fabrication and mechanical behavior of dye-doped polymer optical fiber" J. Appl. Phys., vol. 92(1) pp. 4-12 (Jul. 2002).*

Paturzo et al., "Synthesis and display of dynamic holographic 3D scenes with real-world objects" Opt. Exp. vol. 18(9) pp. 8806-8815 (Apr. 2010).*

Ciuchi et al., "Complex structures of surface relief induced by holographic recording in azo-dye doped elastomer thin films", Macromol., vol. 3615) pp. 5689-5693 (Jun. 2003).*

International Publication No. 2004023220 (A1); Publication Date: Mar. 18, 2004; Abstract Only; 1 Page.

Kim, Nam; "Holographic Applications Based on Photopolymer Materials"; International Workshop on Photonics and Applications; Hanoi, Vietnam; Apr. 5-8, 2004; Document No. XP-002564473; 11 Pages.

International Search Report; International Application No. PCT/US2011/045824; International Filing Date: Jul. 29, 2011; Date of Mailing: Oct. 20, 2011; 6 Pages.

Written Opinion of the International Searching Authority; International Application No. PCT/US2011/045824; International Filing Date: Jul. 29, 2011; Date of Mailing: Oct. 20, 2011; 13 Pages.

Chinese Patent No. 101295161 (A); Publication No. Oct. 29, 2008; Abstract Only; 1 Page.

Chinese Patent No. 101299130 (A); Publication Date: Nov. 5, 2008; Abstract Only; 1 Page.

Japanese Patent No. 2000075774 (A); Publication Date: Mar. 14, 2000; Abstract Only; 1 Page.

International Publication No. 2007125937 (A); Publication Date: Nov. 8, 2007; Abstract Only; 1 Page.

Japanese Patent No. 2008224805 (A); Publication Date: Sep. 25, 2008; Abstract Only; 1 Page.

Japanese Patent No. 2008261928 (A); Publication Date: Oct. 30, 2008; Abstract Only; 1 Page.

"Control of DCG and Non-Silver Holographic Materials"; Last Modified: Apr. 8, 1998; http://www.xmission.com/~ralcon/dcgprocess/p1.html; 14 Pages.

Heinenberg et al.; "Polymeric Nitrones, 1—Synthesis and Modification of Polymeric Nitrones Derived from Polymerizable Aldehydes"; Macromol. Chem. Phys., vol. 200; 1999; pp. 1792-1805.

Heinenberg et al.; "Polymeric Nitrons, 2—Synthesis, Irradiation and Waveguide Mode Spectroscopy of Polymeric Nitrons Derived from Polymeric Benzaldehydes and N-Isopropylhydroxylamine"; Macromolecules, vol. 35; 2002; pp. 3448-3455.

Hvilsted et al.; "The Volume Holographic Optical Storage Potential in Azobenzene Containing Polymers"; Journal of Materials Chemistry, DOI: 10.1039/b900930m; Received: Jan. 15, 2009; Accepted: Jun. 8, 2009; First Published: Jul. 1, 2009; Abstract Only; 1 Page.

Schilling et al.; "Acrylate Oligomer-Based Photopolymers for Optical Storage Applications"; Chemistry of Materials, vol. 11, Issue 2; 1999; Abstract Only; 1 Page.

Zhao et al.; "Holographic Recording in a Photoactive Elastomer"; Advanced Functional Materials, vol. 13, No. 10; Oct. 2003; DOI: 10.1002/adfm.200304358; pp. 781-788.

* cited by examiner

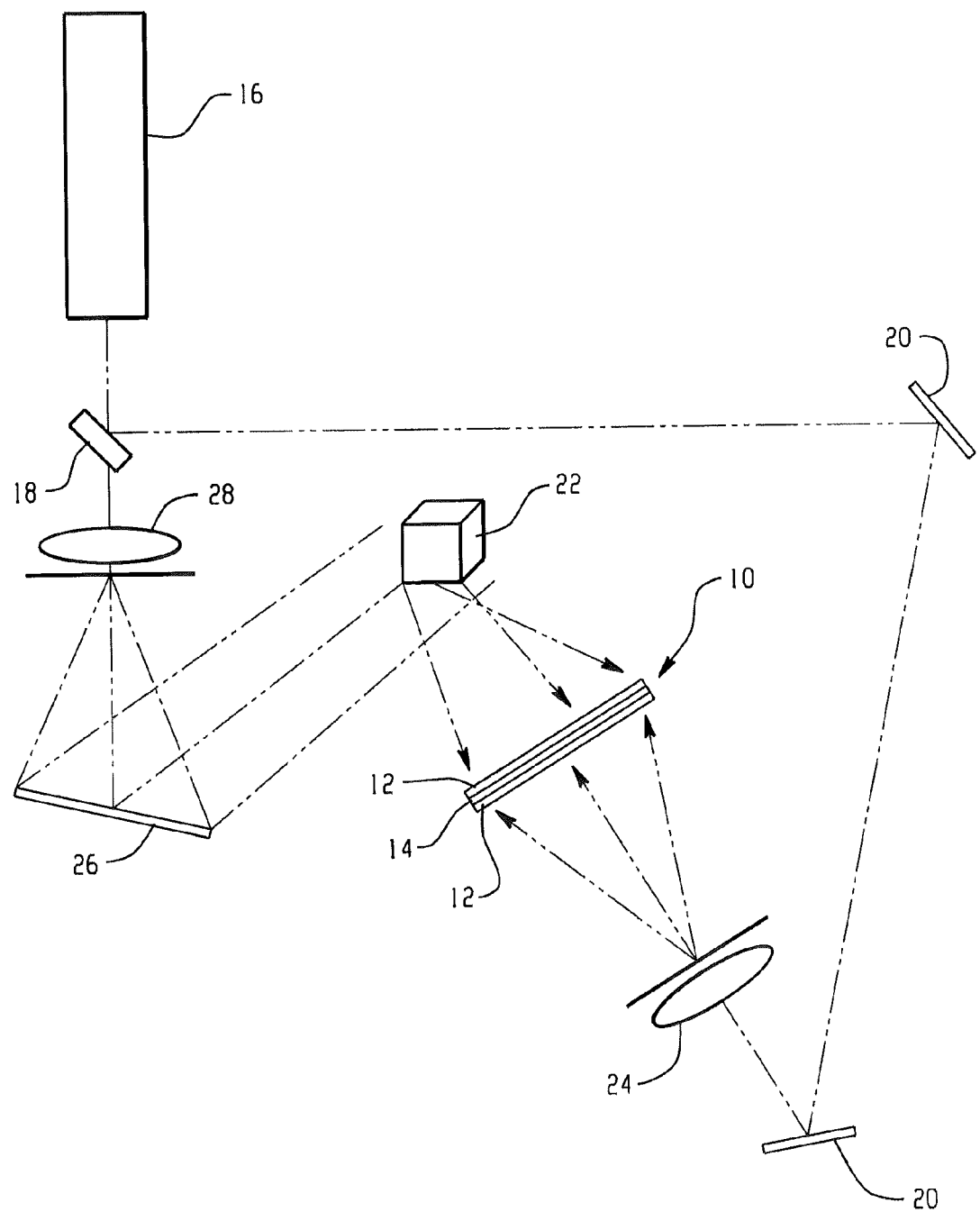

COMPLEX HOLOGRAMS, METHOD OF MAKING AND USING COMPLEX HOLOGRAMS

BACKGROUND

The present disclosure relates to holograms, methods of making and using holograms, and more particularly to complex holograms. Articles incorporating the complex holograms are also disclosed.

Volume holograms are an increasingly popular mechanism for the authentication of genuine articles, whether it is for security purposes or for brand protection. The use of volume holograms for these purposes is driven primarily by the relative difficulty with which they can be duplicated. Volume holograms are created by interfering two coherent beams of light to create an interference pattern and storing that pattern in a holographic recording medium. Information or imagery can be stored in a hologram by imparting the data or image to one of the two coherent beams prior to their interference. The hologram can be read out by illuminating it with a beam matching the geometry and wavelength of either of the two original beams used to create the hologram and any data or images stored in the hologram will be displayed. Typically, holograms can be read out by other light wavelengths that satisfy the Bragg diffraction condition. As a result of the complex methods required to record holograms, their use for authentication can be seen on articles such as credit cards, software, passports, clothing, and the like.

The most common types of volume holograms are transmission holograms and reflection holograms. To form a volume hologram two light beams are used. One beam, known as the signal beam, carries the image information to be encoded in the hologram. The second beam is a plane wave with no information, also known as the reference beam. The object (or signal) beam and the reference beam generate an interference pattern, which is recorded in the form of a diffraction grating within the holographic medium. A transmission hologram is created when both object and reference beams are incident on the holographic medium from the same side, and is so called because in viewing the hologram, the light must pass through the holographic material to the viewer.

On the other hand, during the recording of a reflection hologram, the reference beam and the object beam illuminate the holographic medium from opposite sides. Generally, a reflection hologram only reflects light within a narrow band of wavelengths around the writing wavelength. Because of this, the holographic image of a reflection hologram tends to be monochromatic. The interference fringes are formed by standing waves generated when the two beams, traveling in opposite directions, interact. The fringes formed are in layers substantially parallel to the surface of the film emulsion. Reflection holograms will only reflect wavelengths that are the same as or close to the fringe spacing of the hologram. At a given writing wavelength ($\lambda$), fringe spacings are the same. For a particular writing wavelength ($\lambda$) therefore, the hologram will be monochromatic and reflect only wavelengths close to $\lambda$.

Considerable efforts have been made to develop multi-color reflection holograms. In a conventional approach to multi-color reflection holography, beams of coherent light in each of the primary (additive) colors (red, blue, and green) are used to record distinct holograms in the photographic plate. In practice, registration of the three images is very difficult, particularly for large plates, insofar as the focus and/or magnification of each beam is dependent on its wavelength; good registration requires careful angular adjustment of the beams. The need for additional reference light sources (e.g., a blue light laser and a green light laser, as well as a red light laser) also adds a substantial complexity and cost to the system. Moreover, the recording medium, e.g., the photographic emulsion, typically has a different sensitivity to different wavelengths, dictating careful control of the exposure time and intensity of each beam as well.

Thus, there remains a need for improved methods of making reflection holograms. More particularly, there remains a need for simpler, more cost effective methods of making complex, e.g., multicolor, holograms.

SUMMARY

Disclosed herein are methods of making complex holograms and articles comprising the complex holograms, and methods for use thereof.

In one embodiment, a method of making a hologram in a holographic recording medium having a chemical composition and a medium deformation ratio at a resting state can comprise: changing the medium deformation ratio to a first deformation ratio that is different from the medium deformation ratio, wherein changing the deformation ratio does not change the chemical composition of the holographic recording medium; and recording a first hologram in the holographic recording medium at the first deformation ratio. The holographic recording medium can comprises a photochemically active dye in a deformable, optically transparent material.

In another embodiment, a method of making a hologram in the holographic recording medium, can comprise: recording a first hologram in the holographic recording medium at a first deformation ratio; changing the first deformation ratio to a second deformation ratio that is different from the first deformation ratio, wherein changing the first deformation ratio to the second deformation ratio comprises changing an amount of compression exerted on the holographic recording medium; and recording a second hologram in the holographic recording medium at the second deformation ratio to form a recorded hologram.

In yet another embodiment, a method of making a hologram in the holographic recording medium having a chemical composition, can comprise: recording a first hologram in the holographic recording medium at a first deformation ratio; changing the first deformation ratio to a second deformation ratio that is different from the first deformation ratio; recording a second hologram in the holographic recording medium at the second deformation ratio; changing the second deformation ratio to a third deformation ratio that is different from the first deformation ratio and the second deformation ratio; and recording a third hologram in the holographic recording medium at the third deformation ratio.

In another embodiment, a method of making a hologram in a holographic recording medium, can comprise: simultaneously recording a first hologram in the holographic recording medium at multiple deformation ratios such that the hologram has interference fringes comprising multiple fringe spacings and/or multiple fringe angles.

Also disclosed herein are the holograms formed by the above methods and articles comprising the holograms and methods for using the articles.

In one embodiment, a hologram comprises: a holographic recording medium comprising a photochemically active dye and a photoproduct of the photochemically active dye dispersed in an optically transparent elastomeric material.

In another embodiment, a hologram comprises: a holographic recording medium comprising a photochemically active dye and a photoproduct of the photochemically active dye dispersed in a deformable, optically transparent material, wherein the photoproduct is dynamically reactive to deformation of the material.

In one embodiment a method of using an article having a dynamic hologram can comprise: deforming a holographic recording medium to obtain color change and/or image change the dynamic hologram. The holographic recording medium comprises a photochemically active dye and a photoproduct of the photochemically active dye dispersed in a deformable, optically transparent material.

In one embodiment a method of using an article having a hologram can comprise: reconstructing the hologram in a holographic recording medium comprising a photochemically active dye and a photoproduct of the photochemically active dye in a deformable, optically transparent material.

These and other non-limiting characteristics are more particularly described below.

DESCRIPTION OF THE FIGURES

Referring now to the figures, which are exemplary embodiments and wherein like elements are numbered alike:

FIG. 1 is a schematic representation of a system for making a reflection hologram.

DETAILED DESCRIPTION

Disclosed herein are methods of making complex (e.g., multicolored, images (such as animation), etc.) holograms. More specifically, disclosed herein are methods of making multicolored reflection holograms using a single laser light source. The method generally comprises repeating the recording of the hologram at multiple deformation ratios. The hologram can then be read at one of the recording deformation ratios or at yet a different deformation ratio. The deformation ratio is a ratio of the initial thickness of the holographic medium to the deformed thickness of the medium. It is understood that a medium can comprise multiple deformation ratios simultaneously by deforming different portions of the medium to different degrees (e.g., using a plate having a non-uniform thickness (such as a plate having raised portions, a wedge shaped plate, and so forth)).

The deformation can be employed to change the fringe spacing and/or fringe alignment (e.g., if the alignment is non-parallel to the surface of the medium, when the deformation ratio changes, the fringe alignment will also change) between the recorded condition (e.g., spacing distance and/or alignment angle) and the reconstruction condition. For the purposes of economics, recording using a single wavelength, specifically, recording using a single laser source, is desirable. Multiple fringe alignment(s), however, can be recorded at the same deformation ratio (e.g., greater than or equal to 5, specifically, greater than or equal to 10, more specifically, greater than or equal to 20).

For example, multiple holograms can be recorded with different fringe spacings using a single laser by compressing a holographic medium between transparent plates and writing the reflection hologram at different deformation ratios. By varying the deformation ratios, different fringe spacings can be written in the holographic medium even when using one laser of a single wavelength. This process can be employed alone or in combination with changing the orientation of the intersecting laser beams. Different fringe spacings/alignment can also be achieved with a single laser by changing the hologram writing "geometry", i.e., the orientation of the two intersecting laser beams. In the case of reflection holograms, however, changing the orientation of the laser beams cannot achieve a large enough variation in the spacings to effect significant color change.

The different fringe spacings thereby provide a complex hologram in the medium (e.g., multicolor (e.g., color change), and/or images (e.g., special effects like motion (e.g., animation)). The complex holograms formed by the methods described herein do not require multiple writing lasers of different wavelengths in order to produce the different colors. Additionally, since the deformation can be attained physically (i.e., without adding a material to the medium, thereby changing in the chemical composition of the medium), the process is readily controllable (e.g., specific deformation ratios can be attained and results are reproducible) and recording at multiple (e.g., greater than 2, specifically, greater than or equal to 3 deformation ratios) is possible. In the present method, if there is a change in the composition of the medium, the change is due to the hologram fringe writing that results in a chemical composition change; not due to the addition of a material to cause swelling or the like. Alternatively, or in addition, the hologram fringe writing can be a "conformational" change, e.g., a molecular "shape" change. In other words, the deformation can be attained without chemical composition change, whereas the hologram fringe writing can result in a chemical composition change.

In one embodiment, a method of making a complex hologram comprises recording two or more holograms, wherein each hologram is recorded at a different deformation ratio, and wherein one of the deformation ratios can be 1 (i.e., no compression). All of the recordings can be performed at the same wavelength (e.g., using the same light source). For example, the method can comprise disposing a holographic medium between two transparent plates; varying a deformation ratio of the holographic medium between the two transparent plates; and recording a hologram in the holographic medium for each deformation ratio of the holographic medium. Each hologram can be recorded using the same wavelength. However, a different fringe spacing is formed for each deformation ratio because, once the medium returns to its natural state (e.g., non-deformed state), the fringe spacing is different than the spacing was upon recording.

In another embodiment, different portions of a substrate can concurrently have different deformation ratios (e.g., are each compressed to a different degree) such that, in a single recording step, multiple fringe spacings can be formed in a substrate.

For example, the process can employ discrete deformation, wherein a design (e.g., a symbol, text, picture, and/or the like) can be pressed into the medium such that the deformation ratio(s) across the design is different than the deformation ratio in other locations of the medium. The use of a stamp or mold to locally compress the medium would allow multicolor recording in a single exposure, e.g. a positive mold of an image pressed into a holographic film. For example, a hologram recorded at a green wavelength would yield a final medium with e.g. a red image on a green background. Multiple compression ratios could be used in a single mold to record different colors.

Similarly, multiple deformation ratios can be employed at the same time (e.g., a continuous change in deformation ratio, like a wedge). Continuous deformation, e.g., different amounts of deformation (e.g., compression or tension) on a medium in a gradient, can be employed to attain a continuous change in hologram color upon release of the medium. For example, bending or torsion of the medium during writing can create a complex set of effects (e.g., compressive and tensile) leading to distortion of the hologram fringes and a unique optical effect.

As mentioned previously, reflection holograms can reflect wavelengths that are close to the fringe spacing of the hologram. In a reflection hologram, the fringes are spaced so closely together that they constitute layers throughout the thickness of the holographic medium. The distance between adjacent fringes is a function of the wavelength of light used in constructing the hologram and the angle difference between the reference and object beams. This layered arrangement allows the reflection hologram to transmit, or not diffract, any of the colors or wavelengths of light which are not the correct wavelength, i.e., do not satisfy Bragg condition. In reflection holograms, the wavelengths that match the Bragg condition are close to $\lambda$, the writing wavelength.

With the method described herein, the deformation ratio of a holographic medium is changed; e.g., the medium is compressed, bent, expanded, or otherwise altered, such as in thickness, from a natural state to the deformed state for recording. One or more deformed states can be used with a single medium, depending upon the details of the particular hologram to be recorded (such as multicolored, images. etc.) Because the deformed state is attained mechanically, the degree of change of the medium is readily controllable, and multiple deformations are also attainable. Greater than or equal to 2 deformation ratios can be employed to attain a hologram, specifically, greater than or equal to 3 deformation ratios, more specifically, greater than or equal to 4 deformation ratios, and yet more specifically, greater than or equal to 6 deformation ratios. For example, the medium in its natural state has a first deformation ratio, and the medium can be compressed to a second deformation ratio. Recordings can be made at each of the deformation ratios, at the same laser wavelength. Since the fringe spacing will change when the medium is no longer compressed, the final medium will comprise a hologram having two different fringe spacings (e.g., and therefore, two different colors). When the holographic medium is deformed (e.g., compressed) to the desired deformation ratio, the hologram (e.g., a reflection hologram) is written into the medium, desirably using a single light source. Although multiple light sources and/or multiple wavelengths can be used, the use of a single light source to attain a hologram with multiple fringe spacings reduces manufacturing costs.

Upon release of the deformation (e.g., compression), the holographic medium changes its shape (e.g., expands) and, therefore, so does the fringe spacing. For example, a hologram recorded with "symmetric" beams with fringes parallel to the surface written with a light source of wavelength $\lambda$ at a deformation ratio of X due to compression, would have a fringe spacing value of $\lambda X$. The hologram, therefore, would be viewable at a longer wavelength (X times longer) than would be viewable without the compression. Similarly, if the deformation ratio is due to expansion, the hologram would be viewable at a shorter wavelength (e.g., X times shorter) than would be viewable without the expansion. As mentioned above, in addition or alternative to changing the fringe spacing, the fringe alignment can be changed by changing the deformation ratio. Hence, an asymmetric hologram can be recorded at one deformation ratio, the ratio can be changed, and the hologram can therefore be viewable at a different angle than the recording angle. Deliberate variation of the holographic medium thickness between two or more exposures provides reconstruction wavelengths that are different from that of the reference light source. These reconstructions make multicolor imaging possible with only one color of reference light and thereby permit a single, less expensive laser (e.g., helium-neon or krypton laser generating coherent red light) to be used for writing.

By recording at different deformation ratios, multiple reflection holograms can be recorded with different fringe spacings viewable at different wavelengths. In other words, by recording at different deformation ratios, a complex hologram can be recorded into a medium using a single recording wavelength. Using a series of deformation ratios and writing geometries, a custom, complex hologram can be recorded through multiplexing (i.e., recording multiple fringe spacings using a single wavelength), wherein the multiplexing can be performed at the same location, different location, or a combination thereof.

For example, in one embodiment, a method of making a complex hologram comprises disposing a holographic medium between two transparent plates; compressing the holographic medium between the two transparent plates to a first deformation ratio; writing a reflection hologram in the holographic medium with a light source having a first wavelength to produce a first fringe spacing; changing the deformation ratio of the holographic medium between the two transparent plates to a second deformation ratio different than the first deformation ratio; writing a reflection hologram in the holographic medium with the light to produce a second fringe spacing different than the first fringe spacing; and releasing the compression from the holographic medium to produce the complex hologram. The process can then be repeated for any number of different deformation ratios depending on the desired colors and geometry for the hologram. For example, for an animation hologram, the process can be repeated for greater than or equal to 20 times, specifically, greater than or equal to 50 times, more specifically, greater than or equal to 100 times. The deformation state can also be attained with a single or multiple mechanical processes, such as compression (e.g., between plates, via bending, stretching, etc.), expansion (e.g., via pulling both sides such as by using a vacuum to increase the thickness, via pushing the edges toward one another so that the thickness increases, and so forth).

FIG. 1 is a schematic illustration for the method of making a reflection hologram. As shown in the figure, the reference beam and object beam illuminate the holographic filmplate 10 on opposite sides. The holographic filmplate 10 comprises the two transparent plates 12 with the holographic medium 14 disposed therebetween. A single light source 16 generates a light having a wavelength $\lambda$ which passes through a beam splitter 18 to form the reference and object beams. Minors 20 direct the reference beam to a side of the filmplate 10 opposite the object 22. A spatial filter 24 can be used to spread the reference beam across the surface of the filmplate Likewise, a mirror 26 and spatial filter 28 can be used to direct and spread the object beam across the object 22. Again, the pressure of the two transparent plates 12 on the holographic medium 14 can be changed between each exposure to the light source 16 in order to change the deformation ratio and hence the resulting fringe spacing of the reflection hologram recorded in the filmplate 10. Transmission holograms can also be prepared in a similar fashion wherein both the reference beam and the object beam are directed at the same side of the holographic filmplate 10.

The transparent plates 12 are configured to permit transmission of the light through the plate and onto the holographic medium. They further provide the ability to apply pressure to the holographic medium in order to compress the medium to the desired thickness ratio. Such transparent plates can comprise any material that is transparent to the wavelength of light incident upon the plates. Some possible plates include, those formed from glass, quartz, optical quality plastics (e.g., polycarbonate), and the like, as well as combinations comprising at least one of the foregoing. The transparent plates can be squeezed together by any device capable of compressing the medium without damaging the transparent plates or interfering with the beams. Alternatively, or in addition, the compression can be attained by bending the hologram. Mechanical expansion of the holographic medium can be attained by the use of holographic media which is adhered between two of the foregoing transparent plates, through the use of a vacuum, as well as other alternative, and combinations comprising at least one of the foregoing.

Although no additional processing is needed to visualize the hologram, after the complex hologram has been formed, the medium can optionally be further processed. Further processing can comprise various post processing treatments generally employed with holographic media, such as heat treatment, chemical treatment, application of other layers (e.g., weatherable film (e.g., UV and/or IR protective)). Also, since the interference fringe spacings were formed such that the hologram could be reconstructed with the holographic medium in its natural state (i.e., not deformed; in other words, having a deformation ratio of 1), the medium can be further processed in a manner to inhibit subsequent deformation of the medium or to retain the medium at a particular deformation if reconstruction of the hologram is desired at that deformation condition; i.e., the medium can be fixed or cross-linked at a particular reconstruction deformation ratio. For example, the holographic medium can be coated on one or both sides, cured, shaped, attached to an article, and so forth, as well as combinations comprising at least one of the foregoing processing. For example, a hard coat can be applied to the holographic medium, the medium can be supported (e.g., attached to a substrate), and/or if the holographic medium includes a curable material, the material can be cured. For example, the cured/hardened holographic medium (comprising the hologram) can then be applied to an article to provide security or authenticity verification. The hologram can be attached to the article by various methods including laminating, bonding, gluing, coating, and the like.

The holographic medium comprises a photosensitive material (e.g., a photochromic dye). The holographic recording medium can be a composition comprising a binder and the photochemically active material which is capable of recording a hologram. Once a hologram has been recorded into the medium, the medium can comprise the photochemically active material, the photoproduct of the photochemically active material, and the binder (e.g., optically transparent material that is deformable). Prior to recording the hologram, the photochemically active material can be dispersed (e.g., uniformly dispersed) in the optically transparent material (e.g., elastomeric material). Recording the hologram converts some of the photochemically active material, such that the holographic recording medium with the hologram comprises the photochemically active dye and a photoproduct of the photochemically active dye in the material. Optionally, once the holograph has been recorded, the material can be fixed to inhibit subsequent changes in the deformation ratio. In other words, the material can be processed to prevent deformation; e.g., to fix the deformation ratio at a desired deformation ratio (e.g., at a hologram reconstruction deformation ratio).

The binder composition can comprise inorganic material(s), organic material(s), or a combination of inorganic material(s) with organic material(s), wherein the binder has sufficient deformability (e.g., elasticity and/or plasticity) to enable the desired number of deformation states (e.g., number of different deformation ratios) for the desired recording. The binder should be an optically transparent material, e.g., a material that will not interfere with the reading or writing of the hologram. As used herein, the term "optically transparent" means that an article (e.g., layer) or a material capable of transmitting a substantial portion of incident light, wherein a substantial portion can be greater than or equal to 70% of the incident light. The optical transparency of the layer may depend on the material and the thickness of the layer. The optically transparent holographic layer may also be referred to as a holographic layer.

Exemplary organic materials include optically transparent organic polymer(s) that are elastically deformable. In one embodiment, the binder composition comprises elastomeric material(s) (e.g., which provides the compressibility to the holographic medium). Exemplary elastomeric materials include those derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of elastomeric materials can be used.

Possible elastomeric materials include thermoplastic elastomeric polyesters (commonly known as TPE) include polyetheresters such as poly(alkylene terephthalate)s (particularly poly[ethylene terephthalate] and poly[butylene terephthalate]), e.g., containing soft-block segments of poly(alkylene oxide), particularly segments of poly(ethylene oxide) and poly(butylene oxide); and polyesteramides such as those synthesized by the condensation of an aromatic diisocyanate with dicarboxylic acids and a carboxylic acid-terminated polyester or polyether prepolymer. One example of an elastomeric material is a modified graft copolymer comprising (i) an elastomeric (i.e., rubbery) polymer substrate having a glass transition temperature (Tg) less than 10° C., more specifically less than −10° C., or more specifically −400° to −80° C., and (ii) a rigid polymeric superstrate grafted to the elastomeric polymer substrate. Exemplary materials for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl (meth)acrylates with butadiene and/or styrene; or combinations comprising at least one of the foregoing elastomers. Exemplary materials for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate. As used herein, the term "(meth) acrylate" encompasses both acrylate and methacrylate groups.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Exemplary organic materials that can also optionally be employed in the binder composition are optically transparent organic polymers. The organic polymer can be thermoplastic polymer(s), thermosetting polymer(s), or a combination comprising at least one of the foregoing polymers. The organic polymers can be oligomers, polymers, dendrimers, ionomers, copolymers such as for example, block copolymers, random copolymers, graft copolymers, star block copolymers; or the like, or a combination comprising at least one of the foregoing polymers. Exemplary thermoplastic organic polymers that can be used in the binder composition include, without limitation, polyacrylates, polymethacrylates, polyesters (e.g., cycloaliphatic polyesters, resorcinol arylate polyester, and so forth), polyolefins, polycarbonates, polystyrenes, polyesters, polyamideimides, polyarylates, polyarylsulfones, polyethersulfones, polyphenylene sulfides, polysulfones, polyimides, polyetherimides, polyetherketones, polyether etherketones, polyether ketone ketones, polysiloxanes, polyurethanes, polyethers, polyether amides, polyether esters, or the like, or a combination comprising at least one of the foregoing thermoplastic polymers, such as polycarbonate and polyester.

Organic polymers that are not transparent to electromagnetic radiation can also be used in the binder composition if they can be modified to become transparent. For examples, polyolefins are not normally optically transparent because of the presence of large crystallites and/or spherulites. However, by copolymerizing polyolefins, they can be segregated into nanometer-sized domains that cause the copolymer to be optically transparent.

In one embodiment, the organic polymer and photochromic dye can be chemically attached. The photochromic dye can be attached to the backbone of the polymer. In another embodiment, the photochromic dye can be attached to the polymer backbone as a substituent. The chemical attachment can include covalent bonding, ionic bonding, or the like.

Binary blends, ternary blends and blends having more than three resins may also be used in the polymeric alloys. When a binary blend or ternary blend is used in the polymeric alloy, one of the polymeric resins in the alloy comprises 1 to 99 weight percent (wt %) based on the total weight of the composition. Within this range, it is generally desirable to have the one of the polymeric resins in an amount greater than or equal to 20, preferably greater than or equal to 30 and more preferably greater than or equal to 40 wt %, based on the total weight of the composition. Also desirable within this range, is an amount of less than or equal to 90, preferably less than or equal to 80 and more preferably less than or equal to 60 wt % based on the total weight of the composition. When ternary blends of blends having more than three polymeric resins are used, the various polymeric resins may be present in any desirable weight ratio. In all cases, the deformable component(s) of the system must comprise a majority of the polymeric alloy, such that the alloy retains the ability to deform elastically.

As noted above, the photoactive material is a photochromic dye. The photochromic dye is one that is capable of being written and read by electromagnetic radiation. It is desirable to use photochromic dyes that can be written and read using actinic radiation i.e., a wavelength of 250 to 1,100 nanometers. Specifically, the wavelengths at which writing and reading are accomplished can be 300 nanometers to 800 nanometers. In one embodiment, the writing and reading are accomplished at a wavelength of 300 to 500 nanometers. In another embodiment, the writing and reading are accomplished at a wavelength of 400 to 550 nanometers. Exemplary wavelengths at which writing and reading are accomplished at 405 nanometers and 532 nanometers. Examples of photochromic dyes include a diarylethene and a nitrone.

An exemplary diarylethylene compound can be represented by formula (XI)

(XI)

wherein n is 0 or 1; $R^1$ is a single covalent bond ($C_0$), $C_1$-$C_3$ alkylene, $C_1$-$C_3$ perfluoroalkylene, oxygen; or —N(CH$_2$)$_x$CN wherein x is 1, 2, or 3; when n is 0, Z is $C_1$-$C_5$ alkyl, $C_1$-$C_5$ perfluoroalkyl, or CN; when n is 1, Z is CH$_2$, CF$_2$, or C=O; Ar$^1$ and Ar$^2$ are each independently i) phenyl, anthracene, phenanthrene, pyridine, pyridazine, 1H-phenalene or naphthyl, substituted with 1-3 substituents wherein the substituents are each independently $C_1$-$C_3$ alkyl, $C_1$-$C_3$ perfluoroalkyl, or fluorine; or ii) represented by following formulas:

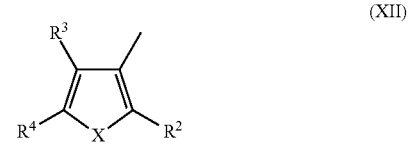

(XII)

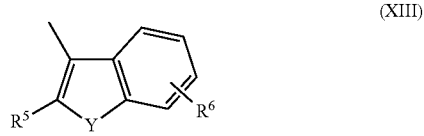

(XIII)

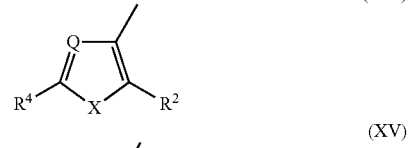

(XIV)

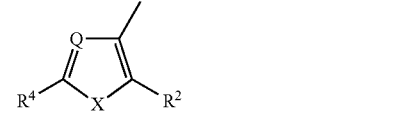

(XV)

wherein $R^2$ and $R^5$ are each independently $C_1$-$C_3$ alkyl or $C_1$-$C_3$perfluoroalkyl; $R^3$ is $C_1$-$C_3$ alkyl, $C_1$-$C_3$ perfluoroalkyl, hydrogen, or fluorine; $R^4$ and $R^6$ are each independently $C_1$-$C_3$ alkyl, $C_1$-$C_3$ perfluoroalkyl, CN, hydrogen, fluorine, phenyl, pyridyl, isoxazole, —CHC(CN)$_2$, aldehyde, carboxylic acid, —(C$_1$-C$_5$ alkyl)COOH or 2-methylenebenzo[d][1,3]dithiole; wherein X and Y are each independently oxygen, nitrogen, or sulfur, wherein the nitrogen is optionally substituted with $C_1$-$C_3$ alkyl or $C_1$-$C_3$ perfluoroalkyl; and wherein Q is nitrogen.

Examples of diarylethenes that can be used as photoactive materials include diarylperfluorocyclopentenes, diarylmaleic anhydrides, diarylmaleimides, or a combination comprising at least one of the foregoing diarylethenes. The diarylethenes are present as open-ring or closed-ring isomers. In general, the open ring isomers of diarylethenes have absorption bands at shorter wavelengths. Upon irradiation with ultraviolet light, new absorption bands appear at longer wavelengths, which are ascribed to the closed-ring isomers. In general, the absorption spectra of the closed-ring isomers depend on the substituents of the thiophene rings, naphthalene rings or the phenyl rings. The absorption structures of the open-ring isomers depend upon the upper cycloalkene structures. For example, the open-ring isomers of maleic anhydride or maleimide derivatives show spectral shifts to longer wavelengths in comparison with the perfluorocyclopentene derivatives.

Examples of diarylethene closed ring isomers include:

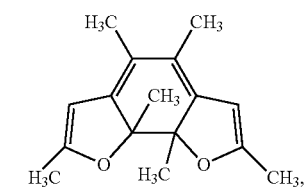
(XVI)

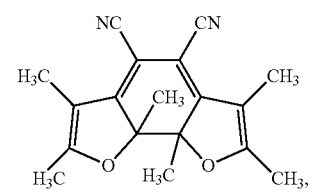
(XVII)

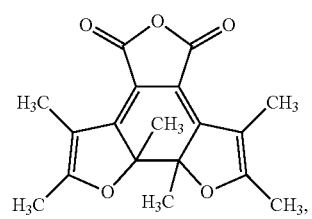
(XVIII)

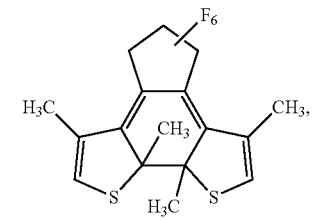
(XIX)

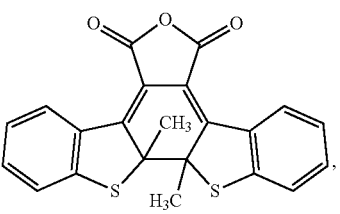
(XX)

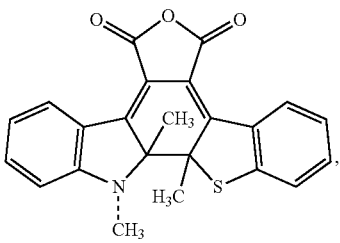
(XXI)

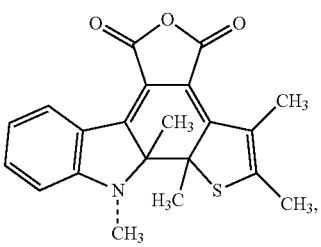
(XXII)

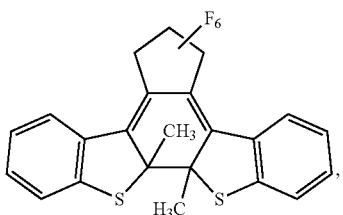
(XXIII)

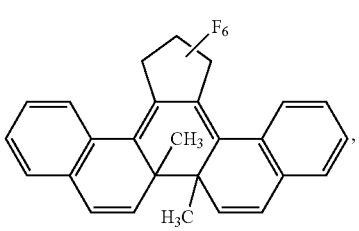
(XXIV)

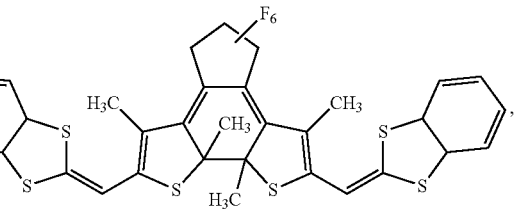
(XXV)

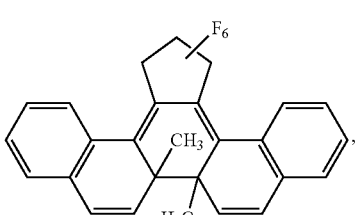
(XXVI)

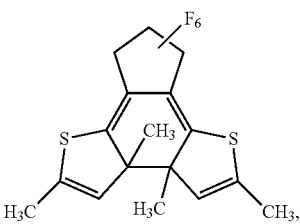
(XXVII)

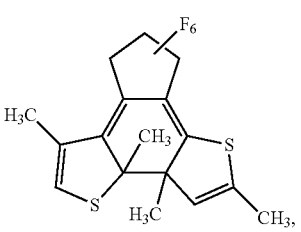
(XXVIII)

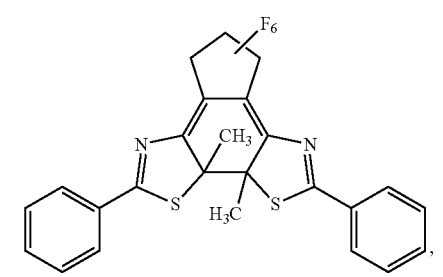
(XXIX)
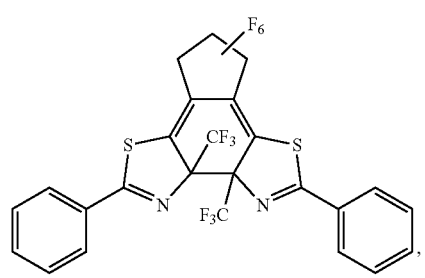
(XXX)
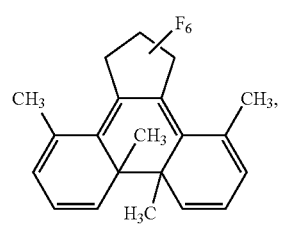
(XXXI)
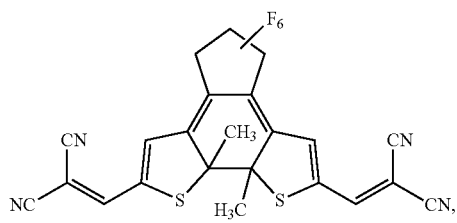
(XXXII)
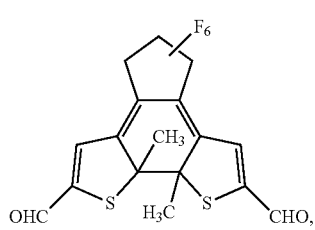
(XXXIII)
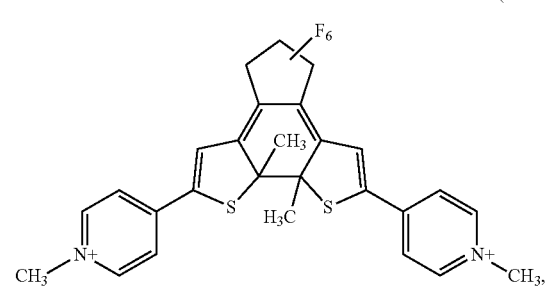
(XXXIV)
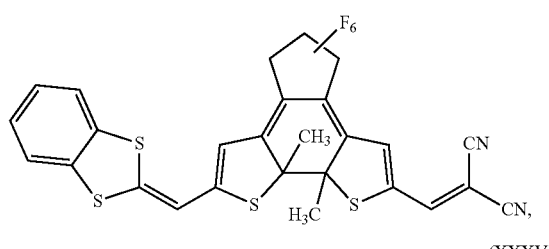
(XXXV)
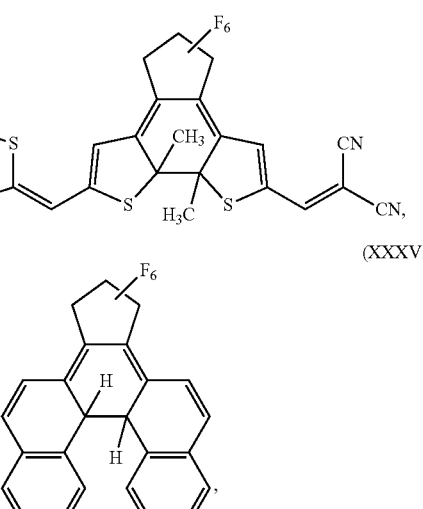
(XXXVI)
(XXXVII)
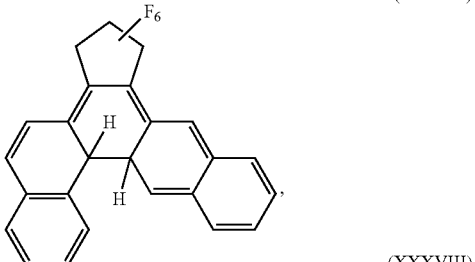
(XXXVIII)
where iPr represents isopropyl;
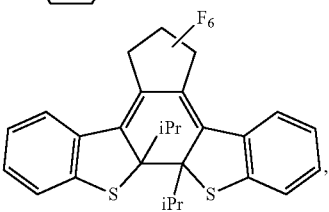
(XXXIX)
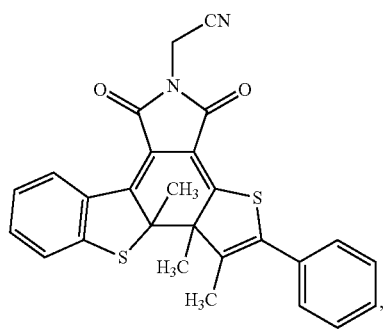
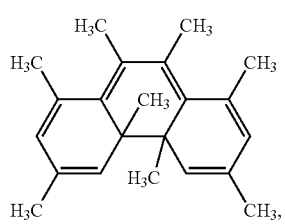
(XXXX)

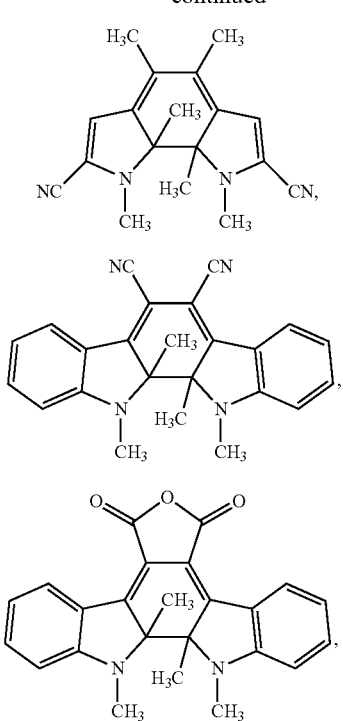

and combinations comprising at least one of the foregoing diarylethenes.

Diarylethenes with five-membered heterocyclic rings have two conformations with the two rings in mirror symmetry (parallel conformation) and in $C_2$ (antiparallel conformation). In general, the population ratio of the two conformations is 1:1. In one embodiment, it is desirable to increase the ratio of the antiparallel conformation to facilitate an increase in the quantum yield, which is further described in detail below. Increasing the population ratio of the antiparallel conformation to the parallel conformation can be accomplished by covalently bonding bulky substituents such as the —($C_1$-$C_5$ alkyl)COOH substituent to diarylethenes having five-membered heterocyclic rings.

In another embodiment, the diarylethenes can be in the form of a polymer having the general formula (XXXXIV) below. The formula (XXXXIV) represents the open isomer form of the polymer.

where Me represents methyl, $R^1$, X and Z have the same meanings as explained above in formulas (XI) through (XV) and n is any number greater than 1.

Polymerizing the diarylethenes can also be used to increase the population ratio of the antiparallel conformations to the parallel conformations.

The diarylethenes can be reacted in the presence of light. In one embodiment, an exemplary diarylethene can undergo a reversible cyclization reaction in the presence of light according to the following equation (I):

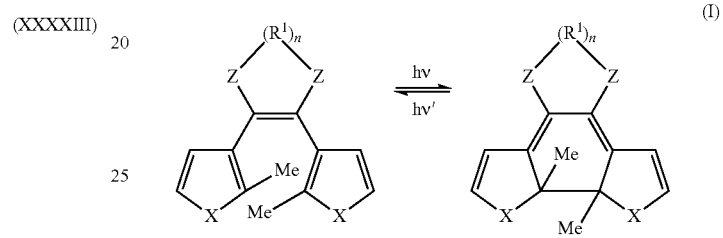

where X, Z $R^1$ and n have the meanings indicated above; and wherein Me is methyl. The cyclization reaction can be used to produce a hologram. The hologram can be produced by using radiation to react the open isomer form to the closed isomer form or vice-versa.

A similar reaction for an exemplary polymeric form of diarylethene is shown below in the equation (II)

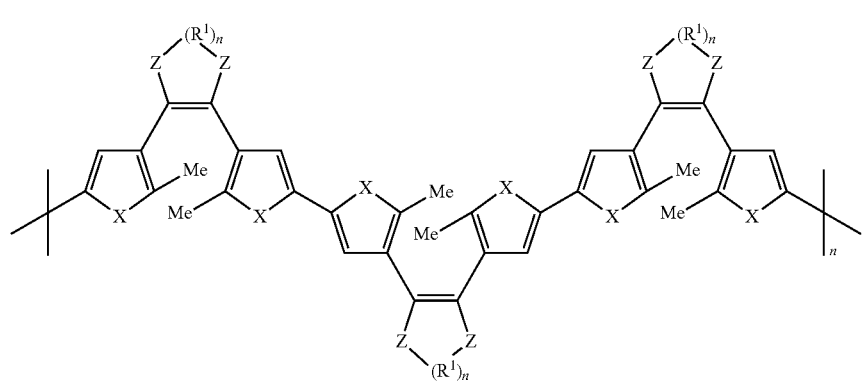

(II)

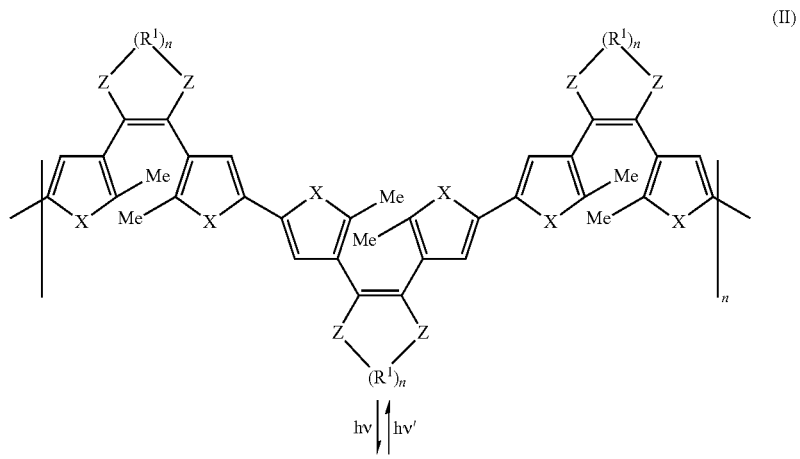

where X, Z R¹ and n have the meanings indicated above; and wherein Me is methyl.

As noted above, in yet another embodiment, a diarylethene can undergo a gated reaction in the presence of light. As noted above, diarylethenes with five-membered heterocyclic rings have two conformations with the two rings in mirror symmetry (parallel conformation) and in $C_2$ (antiparallel conformation). Photocyclization can proceed only from the antiparallel conformation. The photocyclization is prohibited when the compound is fixed in the mirror symmetry conformation. As can be seen in the equation (III) below, the formation of intramolecular hydrogen bonding fastens the compound in the parallel conformation thereby making the compound photochemically inactive. Heat can be used to break this intramolecular hydrogen bonding. Diarylethene compounds having special substituents that reversibly fix the conformation undergo gated photochromic reactions, according to the following equation (III):

(III)

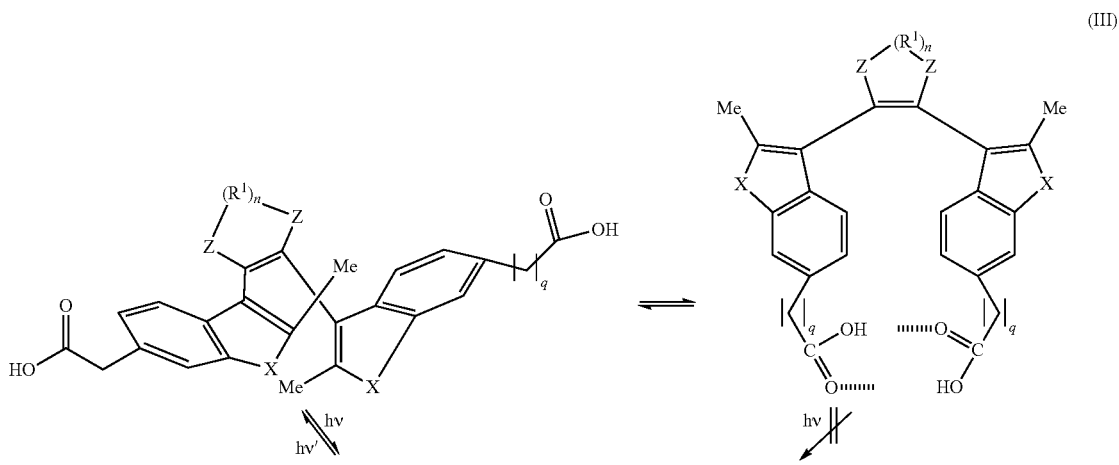

-continued

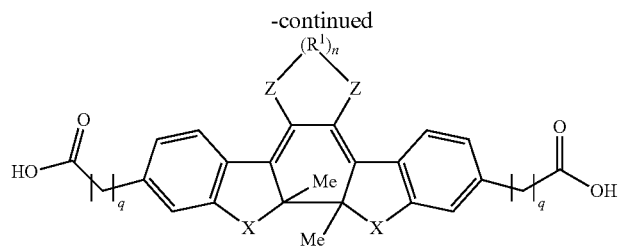

Equation (III) is termed a gated reaction and can preserve stored data even when readout operations are repeatedly conducted at the same wavelength as the writing operation. Thus by using diarylethenes in which gating is made to occur, the writing and reading can be conducted at the same wavelength.

Nitrones can also be used as photochromic dyes in the holographic recording media. Nitrones have the general structure shown in the formula (XXXXV):

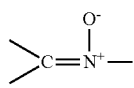
(XXXXV)

An exemplary nitrone generally comprises an aryl nitrone structure represented by the formula (XXXXVI):

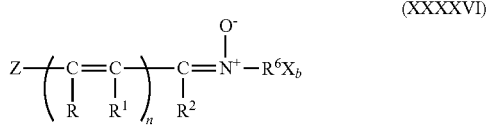
(XXXXVI)

wherein Z is $(R^3)_a$-Q-$R^4$— or $R^5$—; Q is a monovalent, divalent or trivalent substituent or linking group; wherein each of R, $R^1$, $R^2$ and $R^3$ is independently hydrogen, an alkyl or substituted alkyl radical containing 1 to 8 carbon atoms or an aromatic radical containing 6 to 13 carbon atoms; $R^4$ is an aromatic radical containing 6 to 13 carbon atoms; $R^5$ is an aromatic radical containing 6 to 20 carbon atoms which have substituents that contain hetero atoms, wherein the hetero atoms are at least one of oxygen, nitrogen or sulfur; $R^6$ is an aromatic hydrocarbon radical containing 6 to 20 carbon atoms; X is a halo, cyano, nitro, aliphatic acyl, alkyl, substituted alkyl having 1 to 8 carbon atoms, aryl having 6 to 20 carbon atoms, carbalkoxy, or an electron withdrawing group in the ortho or para position selected from the group consisting of

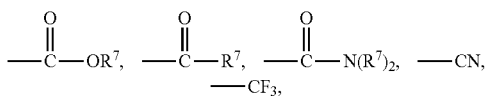

where $R^7$ is a an alkyl radical having 1 to 8 carbon atoms; a is an amount of less than or equal to 2; b is an amount less than or equal to 3; and n is less than or equal to 4.

As can be seen from formula (XXXXVI), the nitrones may be α-aryl-N-arylnitrones or conjugated analogs thereof in which the conjugation is between the aryl group and an α-carbon atom. The α-aryl group is frequently substituted, most often by a dialkylamino group in which the alkyl groups contain 1 to 4 carbon atoms. The $R^2$ is hydrogen and $R^6$ is phenyl. Q can be monovalent, divalent or trivalent according as the value of "a" is 0, 1 or 2. Illustrative Q values are shown in the Table 1 below.

TABLE 1

| Valency of Q | Identity of Q |
|---|---|
| Monovalent | fluorine, chlorine, bromine, iodine, alkyl, aryl; |
| Divalent | oxygen, sulphur, carbonyl, alkylene, arylene. |
| Trivalent | nitrogen |

It is desirable for Q to be fluorine, chlorine, bromine, iodine, oxygen, sulfur or nitrogen.

Examples of nitrones are α-(4-diethylaminophenyl)-N-phenylnitrone; α-(4-diethylaminophenyl)-N-(4-chlorophenyl)-nitrone, α-(4-diethylaminophenyl)-N-(3,4-dichlorophenyl)-nitrone, α-(4-diethylaminophenyl)-N-(4-carbethoxyphenyl)-nitrone, α-(4-diethylaminophenyl)-N-(4-acetylphenyl)-nitrone, α-(4-dimethylaminophenyl)-N-(4-cyanophenyl)-nitrone, α-(4-methoxyphenyl)-N-(4-cyanophenyl)nitrone, α-(9-julolidinyl)-N-phenylnitrone, α-(9-julolidinyl)-N-(4-chlorophenyl)nitrone, α-[2-(1,1-diphenylethenyl)]-N-phenylnitrone, α-[2-(1-phenylpropenyl)]-N-phenylnitrone, or the like, or a combination comprising at least one of the foregoing nitrones. Aryl nitrones are particularly useful in the compositions and articles disclosed herein. An exemplary aryl nitrone is α-(4-diethylaminophenyl)-N-phenylnitrone.

Upon exposure to electromagnetic radiation, nitrones undergo unimolecular cyclization to an oxaziridine as shown in the structure (XXXXVII)

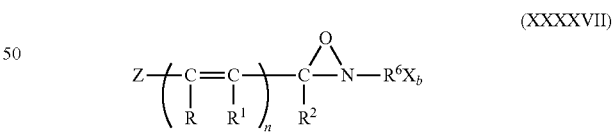
(XXXXVII)

wherein R, $R^1$, $R^2$, $R^6$, n, $X_b$ and Z have the same meaning as denoted above for the structure (XXXXVI).

The holographic composition is advantageous in that it permits manufacturing a holographic recording medium in an efficient and cost effective manner. It also allows for fast replication and can be handled by the end-user. The process further allows recording at one wavelength and reconstruction at another. For example, recording can be accomplished outside the visible range, while reading is within the visible range, or vice versa.

The present method can be employed to form transmission and/or reflection holograms. For transmission hologram, the present method (e.g., compression/tension technique) can be applied if the Poisson's ratio of the holographic material is sufficient such that the induced deformation (e.g., compression, tension, expansion) attains a sufficient deformation of the material perpendicular to the axis of deformation. This enables transmission holograms generating multiple colors to be recorded in a single exposure, with a fixed beam-sample geometry, which is not currently possible.

In non-symmetric media, then there can be a tilt to the fringes. These fringes will change in spacing (e.g., slightly) and noticeably in tilt, as the medium is deformed. Hence, this is another method of using "deformable thermoplastics" to write complex holograms (e.g., multi-colored or multiple images (e.g., animated), such as multiplexed/dynamic holograms).

In one embodiment, a method of making a hologram in a holographic recording medium having a chemical composition and a medium deformation ratio at a resting state can comprise: changing the medium deformation ratio to a first deformation ratio that is different from the medium deformation ratio, wherein changing the deformation ratio does not change the chemical composition of the holographic recording medium; and recording a first hologram in the holographic recording medium at the first deformation ratio. The holographic recording medium can comprises a photochemically active dye in a deformable, optically transparent material.

In another embodiment, a method of making a hologram in the holographic recording medium having a chemical composition, can comprise: recording a first hologram in the holographic recording medium at a first deformation ratio (e.g., wherein the holographic recording medium comprises a photochemically active dye and an optically transparent material that is deformable); changing the first deformation ratio to a second deformation ratio that is different from the first deformation ratio, wherein the chemical composition of the holographic recording medium at each deformation ratio is the same; and recording a second hologram in the holographic recording medium at the second deformation ratio.

In yet another embodiment, a method of making a hologram in the holographic recording medium, can comprise: recording a first hologram in the holographic recording medium at a first deformation ratio (e.g., wherein the holographic recording medium comprises a photochemically active dye and an optically transparent material that is deformable); changing the first deformation ratio to a second deformation ratio that is different from the first deformation ratio, wherein changing the first deformation ratio to the second deformation ratio comprises changing an amount of compression exerted on the holographic recording medium; and recording a second hologram in the holographic recording medium at the second deformation ratio to form a recorded holographic medium.

In still another embodiment, a method of making a hologram in the holographic recording medium having a chemical composition, can comprise: recording a first hologram in the holographic recording medium at a first deformation ratio (e.g., wherein the holographic recording medium comprises a photochemically active dye and an optically transparent material that is deformable); changing the first deformation ratio to a second deformation ratio that is different from the first deformation ratio; recording a second hologram in the holographic recording medium at the second deformation ratio; changing the second deformation ratio to a third deformation ratio that is different from the first deformation ratio and the second deformation ratio; and recording a third hologram in the holographic recording medium at the third deformation ratio.

In another embodiment, a method of making a hologram in a holographic recording medium can comprise: simultaneously recording a hologram in the holographic recording medium at multiple deformation ratios such that the hologram has interference fringes comprising multiple fringe spacings and/or multiple fringe angles.

In an embodiment, a method of using an article having a dynamic hologram, comprises: deforming a holographic recording medium to obtain a reaction in the dynamic hologram. The holographic recording medium comprises a photochemically active dye, a photoproduct of the photochemically active dye, and a deformable, optically transparent material. The reaction can comprise color change and/or image change (e.g., animation (such as related or continuous change in image features)).

Also disclosed herein are the holograms formed by the above methods and articles comprising the holograms. For example, the holograms formed herein can be utilized in various mediums such as: (i) in an authentication device for product security, (ii) in documents of value (e.g., a credit card, an identification card, hotel room key, an access key, a passport, a bill of currency, and so forth), an authentication tag, a shipping manifest, a bill of lading, an electronic information storage device, (iii) for aesthetics (e.g., on a toy, sign, tag, etc.), and/or (iv) in a measuring device (such as in a gauge or indicator (such as a strain gauge, e.g., depending upon the amount of strain, the image and/or color changes)).

In one embodiment, a hologram comprises: a holographic recording medium comprising a photochemically active dye and a photoproduct of the photochemically active dye in a deformable optically transparent material.

In an embodiment, a dynamic hologram comprises: a holographic recording medium comprising a photochemically active dye and a photoproduct of the photochemically active dye dispersed in a deformable, optically transparent material, wherein the photoproduct is dynamically reactive to deformation of the material. In other words, the holographic recording medium can remain deformable enabling it to be dynamic or it can be fixed (e.g., so that the medium is not deformable and therefore not dynamic). Dynamic holograms can be used in articles, e.g., in instruments (for measurement, such as a gauge and/or indicator), toys (e.g., for a reaction to certain conditions such as simulating motion when squeezed).

In one embodiment a method of using an article having a dynamic hologram, comprises: deforming a holographic recording medium to obtain a reaction in the dynamic hologram. The holographic recording medium comprises a photochemically active dye and a photoproduct of the photochemically active dye dispersed in a deformable, optically transparent material. The reaction can comprise color change and/or image change.

In one embodiment a method of using an article having a hologram can comprise: reconstructing the hologram in a holographic recording medium comprising a photochemically active dye and a photoproduct of the photochemically active dye in a deformable, optically transparent material.

In the various embodiments, (i) a second hologram can be recorded in the holographic recording medium at a second deformation ratio; and/or (ii) the second deformation ratio can be equal to the medium deformation ratio; and/or (iii) the recording of the first hologram can create first interference fringes having a first spacing and first alignment and the recording of the second hologram can create second interference fringes having a second spacing and second alignment, and the first spacing is different than the second spacing and/or the first alignment is different than the second alignment; and/or (iv) the method further comprises recording a third hologram at the first deformation ratio or the second deformation ratio, wherein the third hologram has third interference fringes with a third fringe alignment that is different than a fringe alignment of the first interference fringes or the second interference fringes that are recorded at the same deformation ratio; and/or (v) the first hologram and the second hologram are recorded at the same laser wavelength; and/or (vi) the method further comprises changing the second deformation ratio to a third deformation ratio that is different from the first deformation ratio and the second deformation ratio, wherein the chemical composition of the holographic recording medium at each of the second deformation ratio and the third deformation ratio is the same; and recording a third hologram in the holographic recording medium at the third deformation ratio; and/or (vi) the method further comprises fixing the holographic recording medium at a hologram reconstruction deformation ratio other than 1 (e.g., processing the recorded holographic medium in a manner to inhibit subsequent changes in deformation ratio); and/or (vii) the changing of the first deformation ratio to the second deformation ratio comprises a method selected from the group consisting of compressing, expanding, and combinations comprising at least one of the foregoing; and/or (viii) the hologram is a reflection hologram; and/or (ix) the hologram comprises multiple colors and/or multiple images; and/or (x) the material (e.g., optically transparent elastomeric material) can be fixed to prevent deformation; and/or (xi) the article can be selected from the group consisting of a gauge, indicator, and combinations comprising at least one of the foregoing; and/or (xii) using the article can further comprise controlling the deformation such that the reaction constitutes a measurement of the deformation; (xiii) changing of the deformation ratio (e.g., changing the first deformation ratio to the second deformation ratio) can comprise a method selected from the group consisting of compressing, expanding, and combinations comprising at least one of the foregoing; and/or (xiv) changing the deformation ratio can comprise changing an amount of compression exerted on the holographic recording medium; and/or (xv) the deformable optically transparent material can be elastomeric material.

Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming image reflection holograms in a holographic recording medium comprising a photochemically active dye dispersed in a deformable optically transparent polymer binder and not chemically attached to the polymer, the holographic recording medium having a medium deformation ratio at a resting state, comprising:
    exposing the holographic recording medium to interfering coherent light beams to record a first reflection hologram representing an image of a first color comprising interference fringes having a first interference fringe spacing at a first alignment formed from exposed and unexposed photochemically active dye in the holographic recording medium at a first deformation ratio;
    changing the first interference fringe spacing or alignment to an interference fringe spacing or alignment different from the first interference fringe spacing by changing the deformation ratio to a deformation ratio different than the first deformation ratio, without changing the chemical composition of the holographic recording medium, or adding a material to cause swelling; and
    recording a second reflection hologram representing an image of a second color in the holographic recording medium at a second deformation ratio.

2. The method of claim 1, wherein the second deformation ratio is equal to the medium deformation ratio.

3. The method of claim 1, further comprising
    recording a reflection third hologram representing an image of a third color in the holographic recording medium at a third deformation ratio.

4. The method of claim 1, wherein the recording of the second hologram creates second interference fringes having a second spacing and second alignment, and wherein the first spacing is different than the second spacing and/or the first alignment is different than the second alignment.

5. The method of claim 1, further comprising recording a third hologram at the first deformation ratio or the second deformation ratio, wherein the third hologram has third interference fringes with a third fringe alignment that is different than a fringe alignment of first interference fringes or second interference fringes that are recorded at the same deformation ratio.

6. The method of claim 1, wherein the first hologram and the second hologram are recorded at the same laser wavelength.

7. The method of claim 1, further comprising fixing the holographic recording medium at a hologram reconstruction deformation ratio other than 1.

8. The method of claim 1, wherein the changing of the deformation ratio comprises a method selected from the group consisting of compressing, expanding, and combinations comprising at least one of the foregoing.

9. The method of claim 1, further comprising processing the recorded holographic medium in a manner to inhibit subsequent changes in deformation ratio.

10. The method of claim 1, further comprising processing the recorded holographic medium in a manner to facilitate (such as incorporating holographic recording medium in a device) user-desired changes in deformation ratio.

11. The method of claim 1, further comprising repeating changing of the deformation ratio and recording holograms to attain an animation hologram.

12. The method of claim 1, wherein the image hologram is a volume reflection hologram.

13. A method of making a hologram in a holographic recording medium, which allows visualization of said hologram without additional processing, comprising a photochemically active dye dispersed in a deformable optically transparent polymer binder and not chemically attached to the polymer, comprising: simultaneously recording a image hologram in the holographic recording medium at multiple deformation ratios such that the hologram has interference fringes comprising multiple fringe spacings and/or multiple fringe angles.

14. The method of claim 13, further comprising using continuous deformation of the holographic recording medium to attain the multiple deformation ratios.

15. The method of claim 13, further comprising using discrete deformation of the holographic recording medium to attain the multiple deformation ratios.

16. The method of claim 13, wherein the image hologram is a volume reflection hologram.

17. A method of forming image reflection holograms in a holographic recording medium, comprising:

exposing the holographic recording medium to interfering coherent light beams to record a first reflection hologram representing an image of a first color in the holographic recording medium at a first deformation ratio, wherein the holographic recording medium comprises a photochemically active dye dispersed in a deformable optically transparent polymer binder and not chemically attached to the polymer;

mechanically changing the deformation ratio of the holographic recording medium to a second deformation ratio without addition of a material to cause swelling that is different from the first deformation ratio; and recording a second reflection hologram representing an image of a second color in the holographic recording medium at the second deformation ratio to form a recorded holographic medium.

18. The method of claim 17, wherein the changing of the first deformation ratio to the second deformation ratio comprises a method selected from the group consisting of compressing, expanding, and combinations comprising at least one of the foregoing.

19. The method of claim 17, wherein changing the first deformation ratio to the second deformation ratio comprises changing an amount of compression exerted on the holographic recording medium.

20. The method of claim 18, wherein the image hologram is a volume reflection hologram.

* * * * *